(12) United States Patent
Donderici et al.

(10) Patent No.: US 11,434,749 B2
(45) Date of Patent: Sep. 6, 2022

(54) LOCATING MULTIPLE WELLBORES

(71) Applicant: HALLIBURTON ENERGY SERVICES, INC., Houston, TX (US)

(72) Inventors: Burkay Donderici, Houston, TX (US); Baris Guner, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 16 days.

(21) Appl. No.: 16/989,707

(22) Filed: Aug. 10, 2020

(65) Prior Publication Data

US 2020/0370416 A1 Nov. 26, 2020

Related U.S. Application Data

(62) Division of application No. 15/123,597, filed as application No. PCT/US2014/072797 on Dec. 30, 2014, now Pat. No. 10,760,406.

(51) Int. Cl.
*E21B 47/13* (2012.01)
*E21B 47/092* (2012.01)
(Continued)

(52) U.S. Cl.
CPC ............ *E21B 47/0228* (2020.05); *E21B 7/04* (2013.01); *E21B 47/024* (2013.01); *E21B 47/04* (2013.01);
(Continued)

(58) Field of Classification Search
CPC ..... E21B 7/04; E21B 7/06; E21B 7/10; E21B 47/09; E21B 43/2406; E21B 24/0228;
(Continued)

(56) References Cited

U.S. PATENT DOCUMENTS 5,218,301 A 6/1993 Kuckes
5,923,170 A 7/1999 Kuckes
(Continued)

FOREIGN PATENT DOCUMENTS

CA 2460788 9/2005
CA 2773632 10/2013
(Continued)

OTHER PUBLICATIONS

Korean Intellectual Property Office, International Search Report and Written Opinion, dated Sep. 25, 2015, 17 pages, Korea.
(Continued)

*Primary Examiner* — Christopher J Sebesta
*Assistant Examiner* — Lamia Quaim
(74) *Attorney, Agent, or Firm* — Haynes and Boone, LLP

(57) ABSTRACT

Methods and systems are described that can be used for locating conductive bodies such as wellbore casing or piping disposed below the earth's surface. An electrical current can be excited in a conductive body in each wellbore in a given area to produce a magnetic field, and the magnetic field can be detected by a ranging tool. Location and current parameters can be determined for an estimated number of wellbores producing non-negligible contributions to the magnetic field, and the estimated number of wellbores can be adjusted until the number of contributing wellbores is determined. Location solutions can be returned for each of the contributing wellbores, and the location solutions can be employed to facilitate exploration of drilling applications such as well avoidance, well intersection and/or steam assisted gravity drainage (SAGD) steering operations.

12 Claims, 8 Drawing Sheets

(51) Int. Cl.
  *E21B 47/0228* (2012.01)
  *E21B 7/04* (2006.01)
  *E21B 47/024* (2006.01)
  *E21B 47/04* (2012.01)
  *G01V 3/20* (2006.01)
  *G01V 3/26* (2006.01)
  *E21B 47/022* (2012.01)
  *E21B 47/09* (2012.01)
  *E21B 43/24* (2006.01)

(52) U.S. Cl.
  CPC ............ *E21B 47/092* (2020.05); *E21B 47/13* (2020.05); *G01V 3/20* (2013.01); *G01V 3/26* (2013.01); *E21B 43/2406* (2013.01); *E21B 47/022* (2013.01); *E21B 47/09* (2013.01)

(58) Field of Classification Search
  CPC ...... E21B 47/022; E21B 47/024; E21B 47/04; E21B 47/092; G01V 3/26; G01V 3/18; G01V 3/20; G01V 3/28
  See application file for complete search history.

(56) References Cited

U.S. PATENT DOCUMENTS

| | | |
|---|---|---|
| 7,095,232 B2 | 8/2006 | Haber et al. |
| 7,568,532 B2 | 8/2009 | Kuckes et al. |
| 7,617,049 B2 | 11/2009 | McElhinney et al. |
| 7,703,548 B2 | 4/2010 | Clark |
| 7,795,872 B2 | 9/2010 | Clark et al. |
| 7,812,610 B2 | 10/2010 | Clark et al. |
| 8,010,290 B2 | 8/2011 | Illfelder |
| 8,011,451 B2 | 9/2011 | MacDonald |
| 8,278,928 B2 | 10/2012 | Bespalov |
| 8,307,915 B2 * | 11/2012 | Clark .................. E21B 41/0035 175/62 |
| 8,322,462 B2 | 12/2012 | Kuckes |
| 8,596,382 B2 | 12/2013 | Clark et al. |
| 8,749,242 B2 | 6/2014 | Clark |
| 2007/0126426 A1 | 6/2007 | Clark et al. |
| 2009/0201026 A1 | 8/2009 | McElhinney |
| 2009/0260878 A1 | 10/2009 | Morely et al. |
| 2011/0088890 A1 | 4/2011 | Clark |
| 2011/0100712 A1 | 5/2011 | Poedjono |
| 2011/0278067 A1 | 11/2011 | Clark |
| 2011/0282583 A1 | 11/2011 | Clark |
| 2011/0308859 A1 | 12/2011 | Bittar et al. |
| 2011/0309836 A1 | 12/2011 | Bittar et al. |
| 2012/0158305 A1 * | 6/2012 | Rodney .................. G01V 3/26 702/6 |
| 2013/0105224 A1 | 5/2013 | Donderici et al. |
| 2013/0154650 A1 | 6/2013 | Bittar et al. |
| 2013/0173164 A1 | 7/2013 | Zhang |
| 2014/0035586 A1 | 2/2014 | Rodney |
| 2014/0121971 A1 | 5/2014 | Hanak et al. |
| 2017/0160424 A1 * | 6/2017 | Omeragic ............... E21B 49/00 |

FOREIGN PATENT DOCUMENTS

| | | |
|---|---|---|
| WO | WO-2009126376 A3 | 10/2009 |
| WO | WO-2013025222 A3 | 2/2013 |
| WO | WO 2014089402 A2 | 6/2014 |
| WO | WO-2014089490 A1 | 6/2014 |
| WO | WO-2014089505 A1 | 6/2014 |
| WO | WO-2014098891 A1 | 6/2014 |
| WO | WO-2014142796 A1 | 9/2014 |

OTHER PUBLICATIONS

Arthur F. Kuckes, T. Lautzenhiser, A.G. Nekut, R.Sigal, An Electromagnetic Survey Method for Directionally Drilling a Relief Well Into a Blown Out Oil or Gas Well, Apr. 26, 1982, pp. 269-274, SPE 10946, Society of Petroleum Engineers of AIME, Society of Petroleum Engineers Journal.

C.Zimmer, D.Richter, J.Person, J.Tilley and M.Bittar, Drilling a Better Pair: New Technologies in SAGD Directional Drilling, Oct. 19-21, 2010, pp. 115-126, Canadian Unconventional Resources and International Petroleum Conference, Society of Petroleum Engineers, SPE 137137, Calgary, Canada.

Michael Bittar, Hsu-Hsiang Wu and Shanjun Li, New Logging-While-Drilling Ranging Technique for SAGD: Theory and Experiment, Oct. 8-10, 2012, pp. 1-10, SPE Annual Technical Conference and Exhibition, Society of Petroleum Engineers, SPE 159405, San Antonio, Texas.

Yu Zhu and Deli Gao, A new electromagnetic beacon tool for directional drilling in steam assisted gravity drainage horizontal wells, Jul. 5, 2014, pp. 82-91, Journal of Natural Gas Science and Engineering, China.

United Kingdom Intellectual Property Office, Application No. GB1904608.5, Search and Examination Report, dated May 29, 2019, 6 pages, United Kingdom.

Canadian Intellectual Property Office, Application No. 2,964,883, Examiner's Letter, Jan. 29, 2019, 4 pages, Canada.

* cited by examiner

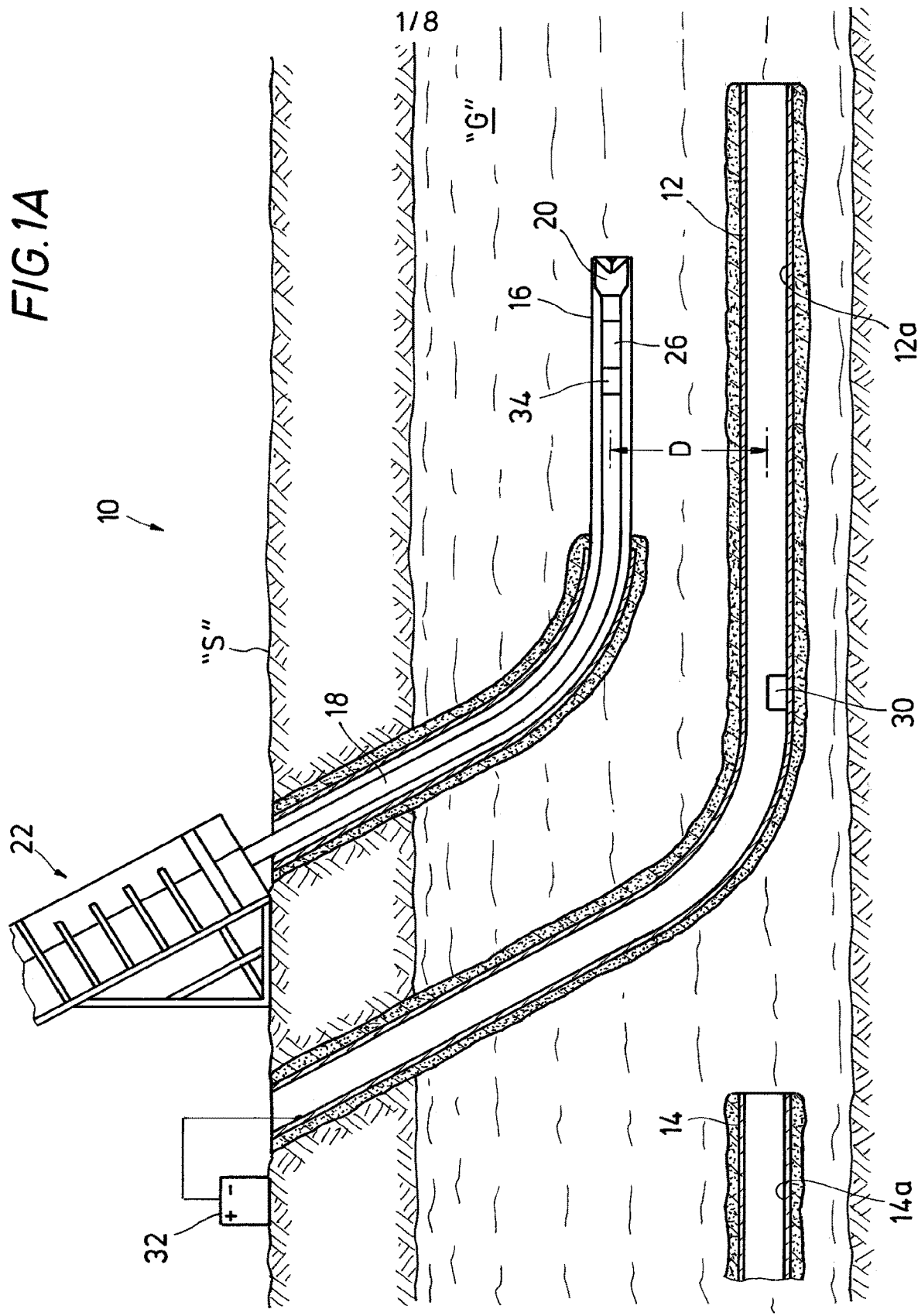

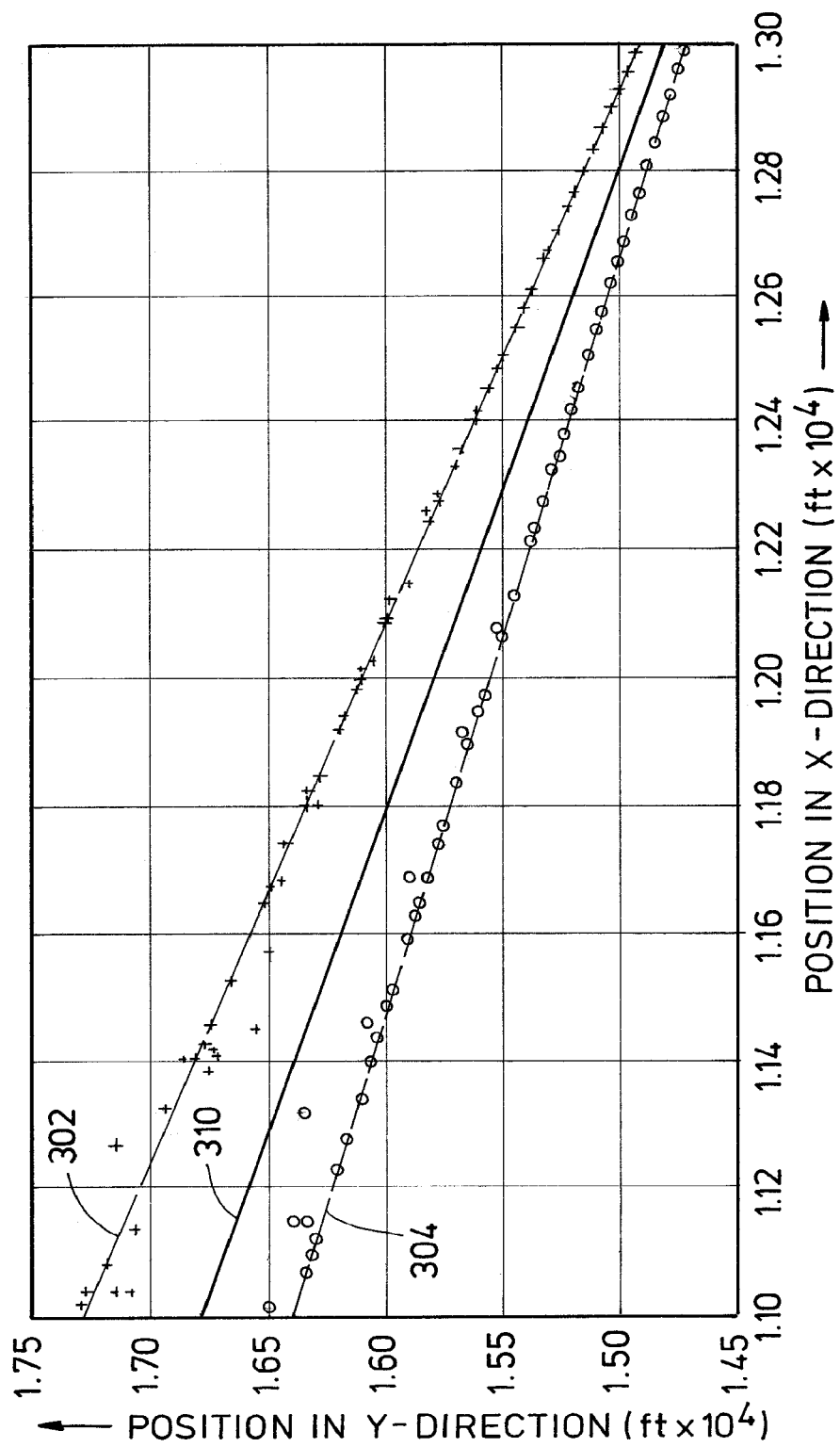

LOCATING MULTIPLE WELLBORES

CROSS REFERENCE TO RELATED APPLICATIONS

This application is a Divisional Application of U.S. patent application Ser. No. 15/123,597, filed Sep. 2, 2016, which is a U.S. national stage patent application of International Patent Application No. PCT/US2014/072797, filed on Dec. 30, 2014, the benefit of each which is claimed and the disclosures of which are incorporated herein by reference in its entirety.

BACKGROUND

1. Field of the Invention

The present disclosure relates generally to making measurements related to oil and gas exploration. More particularly, embodiments of the disclosure relate to systems and methods for measuring electromagnetic fields to detect a number of nearby wellbores, and to determine the locations of the nearby wellbores.

2. Background

In drilling wells for oil and gas exploration, understanding the structure and properties of the associated geological formation provides information to aid such exploration. In addition, drilling can be enhanced with systems and methods to detect conductive bodies below the earth's surface. The conductive bodies can include metal structures, e.g., casing and piping used in various down-hole operations, where the detection of the metal structures can reveal subterranean positions of existing wellbores. For example, the positions of existing wellbores can influence drilling operations in crowded fields where legal or land restrictions require wells to be drilled in close proximity with one another. In some instances, well avoidance is an important consideration in drilling in the crowded fields, and in some instances, well intersection can be intentional, e.g., for the repair of a damaged wellbore.

In other instances, determining the position of existing wellbores can facilitate drilling a wellbore in a predetermined relationship to the existing wellbore. For example, in steam assisted gravity drainage (SAGD) applications, a wellbore is often drilled parallel to existing wellbores. Generally in SAGD applications, steam is used in conjunction with two spaced apart wellbores (an SAGD pair) to address the mobility problem of heavy oil in a formation. High temperature steam may be injected into an upper wellbore (the injector), and used to heat the heavy oil to reduce its viscosity and thereby enhance the flow of the heavy oil into a lower wellbore (the producer) to enhance extraction of the heavy oil. Preferably, the injector and producer are drilled at a distance of only a few meters from one other, e.g., about 5 to about 15 meters. If the injector is positioned too close to the producer, the producer would be exposed to very high pressure and temperature and steam would be directly communicated to the producer. If the injector is positioned too far from the producer, the efficiency of the SAGD process is reduced. In order to assist in ensuring that the injector of an SAGD pair is positioned as desired relative to the producer wellbore, a survey of the geologic formation is often conducted. These surveying techniques are traditionally referred to as "ranging." Often, these ranging techniques can be frustrated by the proximity of multiple nearby wellbores, e.g., where it can be difficult to distinguish magnetic fields contributed from a target wellbore from other nearby existing wellbores in a crowded field.

BRIEF DESCRIPTION OF THE DRAWINGS

The disclosure is described in detail hereinafter on the basis of embodiments represented in the accompanying figures, in which:

FIG. 1A is a cross-sectional schematic side-view of a system of wellbores including first and second existing wellbores and a third wellbore having a drill string or other conveyance equipped with a ranging tool disposed therein in accordance with one or more exemplary embodiments of the disclosure;

FIG. 8 is a graphical view of the simulated two-wellbore system of FIG. 6 illustrating positional data points calculated for the first and second wellbores overlying the respective simulated location curves.

DETAILED DESCRIPTION

Figure 1B:
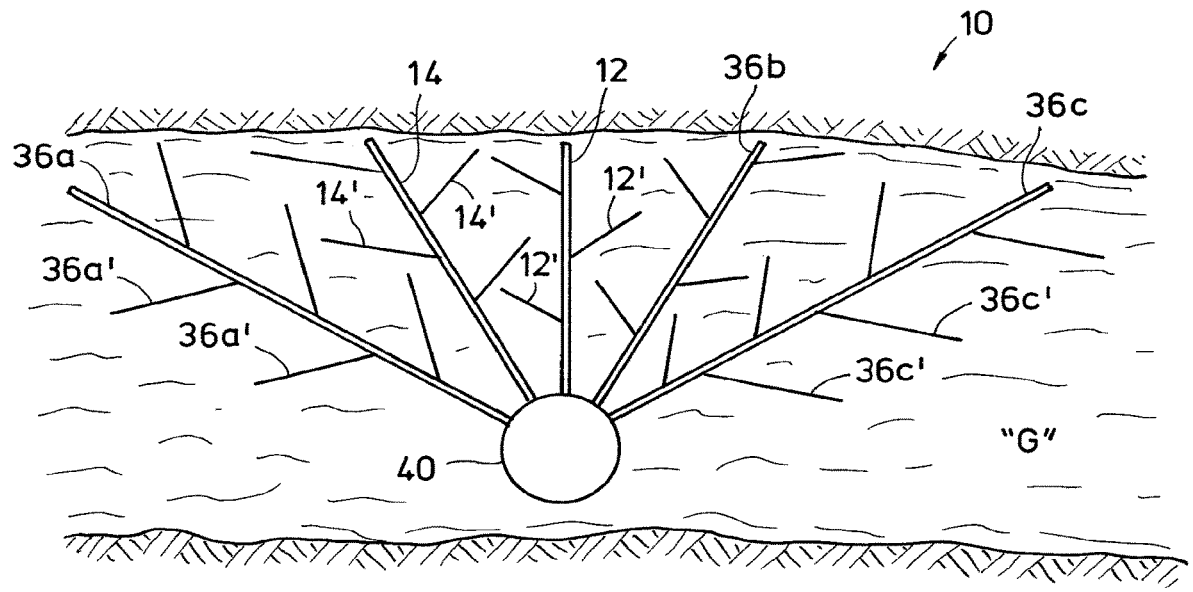
FIG. 1B is a cross-sectional schematic top-view of the system of wellbores of FIG. 1A illustrating a crowded field of existing wellbores proximate the first, second and third wellbores.

In the interest of clarity, not all features of an actual implementation or method are described in this specification. Also, the "exemplary" embodiments described herein refer to examples of the present invention. In the development of any such actual embodiment, numerous implementation-specific decisions may be made to achieve specific goals, which may vary from one implementation to another. Such would nevertheless be a routine undertaking for those of ordinary skill in the art having the benefit of this disclosure. Further aspects and advantages of the various embodiments and related methods of the invention will become apparent from consideration of the following description and drawings.

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "below," "upper," "up-hole," "down-hole," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

1. Description of Exemplary Embodiments

FIG. 1 illustrates a multi-wellbore system 10 including a first wellbore 12 and a second wellbore 14 formed in a geologic formation "G." In some exemplary embodiments, the geologic formation "G" is an oil sand or other heavy oil formation disposed at a relatively shallow depth, e.g., 70-600 m below a surface location "S." The first and second wellbores 12, 14 can be employed for recovery of heavy oil from the geologic formation "G" using processes such as SAGD operations. The systems and methods, in accordance with the teaching herein, can be used to provide SAGD steering, and such SAGD steering can be applied to non-horizontal wells as well. Although the multi-wellbore system 10 is described herein below as employed in conjunction with SAGD operations, it should be appreciated that aspects of disclosure may be practiced in conjunction with offshore ranging operations or other types of exploration as well.

The first and second wellbores 12, 14 include respective electrically conductive bodies 12a, 14a therein. The electrically conductive bodies 12a, 14a can include strings of casing pipe, production tubing or other elongate metallic media in which electrical currents can be excited. As described in greater detail below, electrical currents excited in the electrically conductive bodies 12a, 14a in the first and second wellbores 12, 14 can facilitate magnetic ranging processes for drilling a third wellbore 16 along a path having a predetermined relationship with a path defined by the first wellbore 12. The predetermined relationship can include, e.g., a generally parallel, horizontal relationship to facilitate SAGD operations. By allowing two or more wellbores 12, 16 to be positioned within extremely tight tolerances, magnetic ranging technology can help eliminate positional uncertainty of conventional surveys and can provide more precise tolerance for SAGD wells. In other embodiments, the predetermined relationship can be an intersecting relationship where the third wellbore 16 intersects the first wellbore 12 at a predetermined and/or true depth, a lateral branching relationship where the third wellbore 16 branches from the first wellbore 12 at a predetermined location.

The first wellbore 12 can be employed as the "producer" in a SAGD system and the third wellbore 16 can be employed as the "injector" in a SAGD system. The third wellbore 16 is being drilled proximate the first wellbore 12 at a distance "D" therefrom. In some example embodiments, the distance "D" can be in the range of about 5 to about 15 meters. The third wellbore 16 is being drilled with a drill string 18 having a drill bit 20 at a lower end thereof. A slant drilling rig 22 is erected at the surface location "S" to support the drill string 18 at shallow angles, e.g., at angles in the range of about 15° to about 75° from horizontal. In some example embodiments, the slant drilling rig 22 can support the drill string 18 at angles of between 0° and 90° (inclusive) from horizontal. Often slant drilling is employed to facilitate access to the shallow geologic formations "G" where heavy oils are entrapped and SAGD operations are generally conducted.

A ranging tool 26 is carried by the drill string 18. The ranging tool 26 can be employed to determine the location of the conductive body 12a within the first wellbore 12, thus permitting the drill bit 20 to be steered to maintain the third wellbore 16 at the distance "D" from the first wellbore 12, or at any spatial relationship therewith. As described in greater detail below, the ranging tool 26 is operable to detect a magnetic field generated by separate electric currents propagated through electrically conductive bodies 12a, 14a, and measure wellbore parameters of both the first and second wellbores 12, 14 to guide the drill string 18. In some example embodiments, the ranging tool 26 can be deployed independently of a drill string 18. For example, the ranging tool 26 can be deployed into an additional existing wellbore (not shown) by wireline, coiled tubing or other recognized methods. Alternatively or additionally, the ranging tool 26 can be deployed by moving the ranging tool 26 across the surface location "S."

The electric currents propagated through the conductive bodies 12a, 14a can be excited in any recognized manner, e.g., by using a down-hole electrode source 30, or by directly coupling an electrically conductive body 12a to a current source 32 at the surface location "S." In some example embodiments, the currents can be remotely excited by coil antennas 34, which form a part of, or are carried by, the drill string 18. In some embodiments, the electrical currents can be excited by the transmitters 52 (FIG. 2) provided in the ranging tool 26.

Referring to FIG. 1B, in some example embodiments, the first wellbore 12 in the multi-wellbore system 10 can have a plurality of "fishbone" or lateral wellbores 12' branching therefrom. The lateral wellbores 12' can permit production from a wider expanse of the geologic formation "G" than through the first wellbore 12 alone. Similarly, the second wellbore 14 can include lateral wellbore 14' branching therefrom. Additional wellbores 36a through 36c are drilled in the vicinity of the first and second wellbores 12, 14 and together with the respective lateral wellbores 36a' through 36c', the wellbores 12, 14 and 36a through 36c can produce from a relatively large horizontal area of the geologic formation "G." Each of the wellbores 12, 14 and 36a through 36c can be drilled from a relatively small, common drilling area 40. The field of wellbores defined by the wellbores 12, 14 and 36a through 36c can be characterized as a crowded field, particularly near the common drilling area 40. As the third wellbore 16 is drilled through the crowded field, e.g., from the drilling area (point A) to a terminal end (point B), the number of "nearby" wellbores frequently changes. As used herein, a "nearby wellbore" includes at least a wellbore having a current excited therein that produces a magnetic field detectable by a ranging tool 26. Each one of the wellbores 36a through 36c, and each of the respective lateral wellbores 36a' through 36c' can also include an individual electrically conductive body (not explicitly shown) therein that can generate a magnetic field detectable by the ranging tool 26. Thus, accurately interpreting the electromagnetic field received and detected by the ranging tool 26 at any particular location can include determining a number of wellbores making a contribution to the received electromagnetic field.

Figure 2:
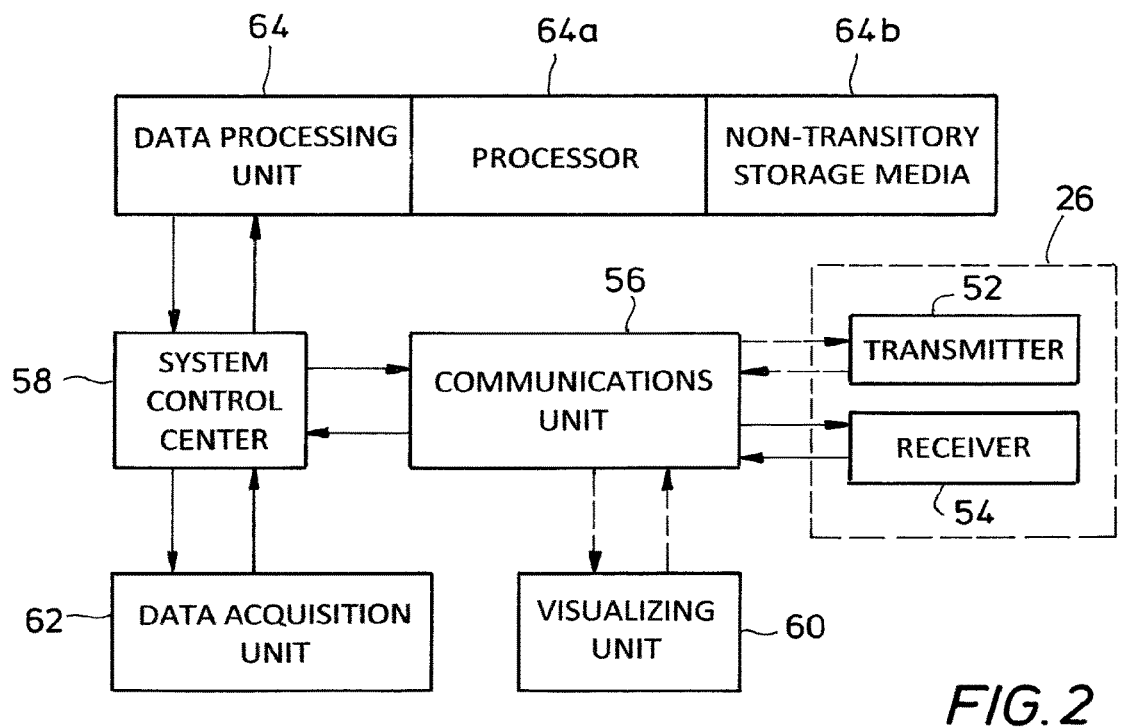
FIG. 2 is a schematic diagram of system for determining the number and locations of multiple wellbores including receivers of the ranging tool of FIG. 1A in accordance with example embodiments of the disclosure.

Referring to FIG. 2 and with continued reference to FIGS. 1A and 1B, a system 50 for determining the number, locations and/or other wellbore parameters of multiple wellbores is illustrated. The system 50 can include transmitters 52 and receivers 54. In some example embodiments, the transmitters 52 can form a part of the ranging tool 26, and can be carried by a drill string 18 (FIG. 1A). The transmitters 52 can be operable to generate an electromagnetic probe signal that causes current to flow in the electrically conductive bodies 12a, 14a (FIG. 1A). In some example embodiments, the transmitters 52 can include a focused electric dipole source operable to induce the electric current in the electrically conductive body 16, which is exterior to the structure of the transmitters 52. In some example embodiments, the transmitters 52 can be deployed independently of the ranging tool 26, e.g., by wireline into an adjacent wellbore 36b, or can be mounted at stationary location with respect to the geologic formation "G." As used herein, the term "transmitter" can include other such mechanisms for inducing the electric currents in the electrically conductive bodies 12a and 14c (FIG. 1A) such as the electrode 30 and/or current source 32.

The receivers 54 may include any mechanism that detects, measures and/or collects a magnetic field for processing. For example, coil antennas or magnetometers can be used. The receivers 54 can be operable to measure or collect for processing an electromagnetic field emitted from one or more electrically conductive bodies 16 (FIG. 1A), as a result of the probe signal generated from the transmitters 52. The electrically conductive bodies 12a, 14a, and the wellbores 12, 14, 36a through 36c and 36a' through 36c' containing the electrically conductive bodies 12a, 14a, can be detected from the magnetic field, and the appropriate locations and other wellbore parameters can be determined therefrom.

The system 50 also includes a communications unit 56, which facilitates interaction among a system control center 58, a visualizing unit 60 and the transmitters 52 and receivers 54. The communications unit 56 can provide a bi-directional telemetry system for communication between down-hole components, e.g., the ranging tool 26, and components located at the surface location "S," e.g., the visualizing unit 60. Communications unit 56 can employ combinations of wired communication technologies and wireless technologies at frequencies that do not interfere with ongoing measurements made by the ranging tool 56. The visualizing unit 60 can include computer monitors, printers or other devices that permit an operator at the surface location "S" to monitor data generated by the system 50. The operator may monitor the data to determine whether intervention into the system 50 is necessary.

The system control center 58 can be disposed within the ranging tool 26, at another down-hole location, or at the surface location "S," and can include a computer with a processor and a non-transitory memory associated therewith. The system control center 58 can manage the generation of transmission signals, e.g., instructions signals for the transmitters 52, and can manage the collection of received signals, e.g., data signals from the receivers 54, corresponding to the transmission signals. The frequency at which the transmission signals are provided can be controlled by the system control center 58. The system control center 58 is also operably coupled to a data acquisition unit 62 and a data processing unit 64. The data acquisition unit 62 can include analog to digital converters, or other mechanisms for converting the received signals into a form useable by the system control center 58 and/or the data processing unit 64.

The data processing unit 64 can convert the received signals into information indicating the number, position and directional characteristics of wellbores in the vicinity of the ranging tool 26 as described in greater detail below. This information can be provided to the visualizing unit 60 for evaluation by an operator. In some embodiments, the data processing unit 64 may include a processor 64a and a computer readable medium 64b operably coupled thereto.

The computer readable medium 64b can include a nonvolatile or non-transitory memory with data and instructions that are accessible to the processor 64a and executable thereby. In one or more embodiments, the computer readable medium 64b is pre-programmed with predetermined thresholds $Th^{field}$ and $Th^{misfit}$, which, as described in greater detail below, can be at least partially dependent on characteristics of the ranging tool 26. The computer readable medium 64b may also be pre-programmed with predetermined sequences of instructions for performing various steps of procedures 100, 200 described below with reference to FIGS. 5A and 5B.

Figure 3:
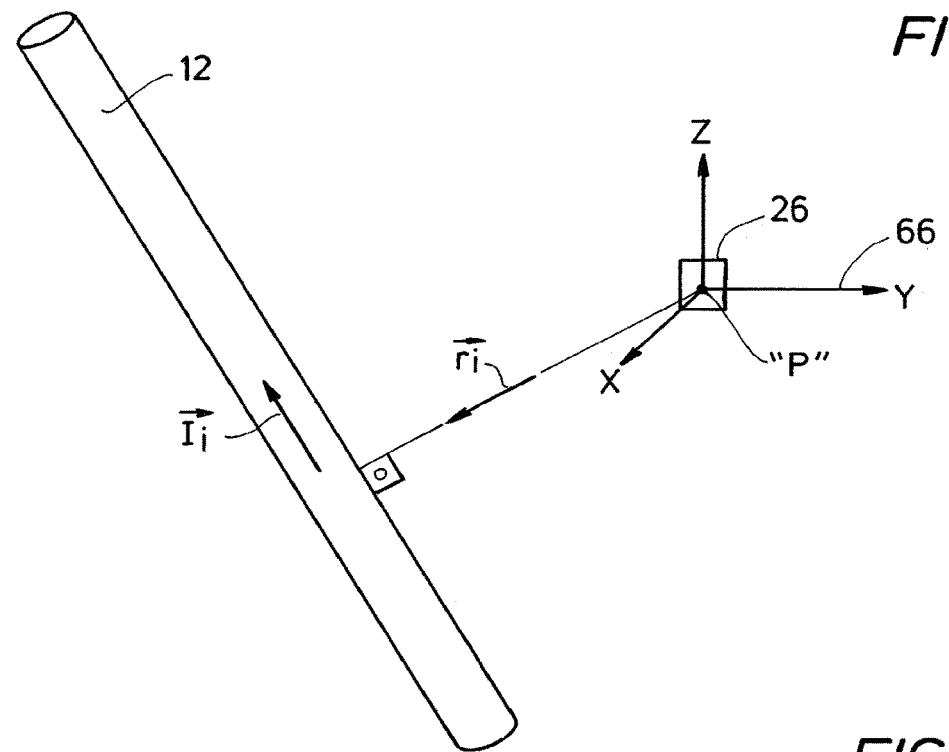
FIG. 3 is a schematic view of the ranging tool and the first wellbore of FIG. 1A illustrating various parameters of the first wellbore that are determinable by the system of FIG. 2.

Referring to FIG. 3, parameters associated with a wellbore, which can be determined by the data processing unit 64 (FIG. 2) are illustrated. These parameters include position and direction parameters that can fully define the location of the wellbore in three-dimensional space. Only the first wellbore 12 is illustrated in FIG. 3, although, each wellbore in the multi-wellbore system 10 can be defined by a similar parameter set.

In one or more embodiments, a wellbore parameter set may include a vector parameter $\vec{I}_i$, which represents a current flowing through the wellbore 12 in an axial direction of the wellbore 12, and a vector parameter $\vec{r}_i$ representing an orthogonal distance between the wellbore 12 and a reference point "P" defined with respect to the ranging tool 26. The reference point "P" is illustrated at the center of coordinate system 66, and the vector parameters $\vec{I}_i$ and $\vec{r}_i$ can be directionally defined with respect to the coordinate system 66. The subscript "i" denotes an index number of the first wellbore 12, or more generally, any of the wellbores in a multi-wellbore system 10. The index "i" is an integer ranging from 1 to $N^{pipe}$, where $N^{pipe}$ is a number of wellbores. The number of wellbores represented by $N^{pipe}$ can be a total number of wellbores in a multi-wellbore system 10, a number of nearby wellbores that make a non-negligible contribution (defined in greater detail below) to the magnetic field detected by the ranging tool 26, or an estimated number of wells. Both of the vector parameters $\vec{I}_i$ and $\vec{r}_i$ have three degrees of freedom, and thus, there are at least six variables or "unknown" parameters in a parameter set associated with the first wellbore 12, and each of the $N^{pipe}$ wells. The vector parameters $\vec{I}_i$ and $\vec{r}_i$ are determinable by the system 50, and other parameters such as azimuth angle and orientation of the first wellbore 12 can be determined from the vector parameters $\vec{I}_i$ and $\vec{r}_i$. For steering the ranging tool 26 relative to the first wellbore 12, it is not necessarily required to determine the strength of the current propagated through the first wellbore 12, i.e., the magnitude of current vector $\vec{I}_i$. However, as described below, determining the current vector $\vec{I}_i$ can facilitate determining the contribution of the first wellbore 12 to a field detected by the ranging tool 26.

Figure 4:
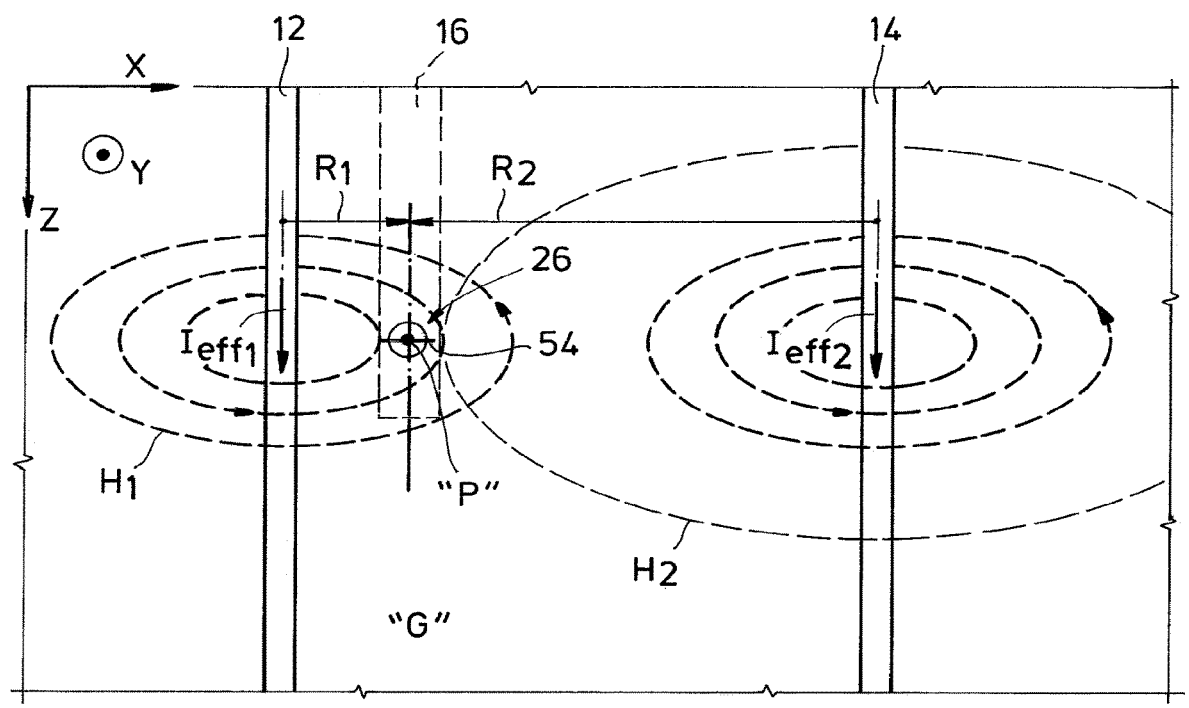
FIG. 4 is a schematic view of the ranging tool and multiple wellbores of the network of FIG. 1A illustrating magnetic fields detectable by the ranging tool.

As illustrated in FIG. 4, a first magnetic field $H_1$ is induced by the first effective current $I_{eff_1}$ flowing through the first wellbore 12. A second magnetic field $H_2$ is induced by a second effective current $I_{eff_2}$ flowing through the second wellbore 14. The ranging tool 26 is located at within the third wellbore 16 at respective radial distances $R_1$ and $R_2$ from the wellbores 12 and 14. The ranging tool 26 can include receivers 54 in the form of tri-axial coil antennas, i.e., a set of three antennas whose magnetic moment vectors form an orthogonal system spanning the entire field. Thus, the ranging tool 26 can be sensitive to the fields $H_1$ and $H_2$, regardless of the orientation of the fields $H_1$ and $H_2$ with respect to the receivers 54. The combined magnetic field detected by the ranging tool 26 includes a contribution from each of the fields $H_1$ and $H_2$. Assuming that the wellbores 12 and 14 are infinitely long, and assuming that the effective currents $I_{eff_1}$ and $I_{eff_2}$ are constant, each of the magnetic fields $H_1$ and $H_2$ can be expressed by equation (1) below.

$$\vec{H}(\vec{r}) = \frac{I_{eff}}{2\pi R} \hat{\phi} \qquad (1)$$

In equation (1), $\vec{H}$ denotes the magnetic field, $\hat{\phi}$ is the unit vector in an azimuthal direction, and $\vec{r}$ is the position vector for the receivers 54 (FIG. 2) of the ranging tool 26. Even though equation (1) is used as the basis of the mathematical formulation presented next, in some exemplary embodiments, is possible to replace equation (1) with a more precise version of the equation by including the axial variations of the current on a pipe, for example. From equation (1) it is seen that the magnetic field $\vec{H}$ detected by the ranging tool 26 can be inversely proportional to the radial distances $R_1$ and $R_2$ between the wellbores 12 and 14 and the receivers 54. The assumptions regarding the infinite lengths and constant currents have generally been demonstrated to yield sufficiently accurate approximations of the wellbore parameters for steering purposes. In particular, these assumptions yield relatively accurate approximations of the wellbore parameters for wellbores nearest the receivers 54 where the radial distances $R_1$ and $R_2$ are the smallest and where accuracy can be relatively significant for steering. The formulation of the magnetic fields given in equation (1) is thus employed throughout this specification. However, if different descriptions of the magnetic fields radiated from the wellbores are available; these descriptions may be employed without departing from the spirit and scope of the present disclosure.

When the ranging tool 26 is deployed, each receiver 54 can make distinct measurements of the total magnetic field $\vec{H}$. A number of receivers 54 provided on the ranging tool 26 can be designated as $N^{rec}$. In some exemplary embodiments, at least some of the receivers 54 are single axis magnetometers, and in some exemplary embodiments, at least some of the receivers 54 are tri-axial or other multi-axial receivers. The number of receivers $N^{rec}$ can designate the number of axes along which the receivers are disposed. For example, where four (4) tri-axial receivers 54 are provided on a ranging tool 26 in various orientations, the number of receivers $N^{rec}$ can be defined as twelve (12). Using the formulation for the magnetic fields given in equation (1) above, for each of the $N^{rec}$ receivers 54, the magnetic field can be described by one of the $N^{rec}$ equations illustrated by equations (2) through (3) below.

$$Hu_1 = \sum_{i=1}^{N^{pipe}} \frac{|\vec{I}_i|}{2\pi |\vec{r}_i - \vec{r}_{u1}|} (\vec{I}i \times (\vec{r}_i - \vec{r}_{u1})) \cdot \hat{u}_1 \qquad (2)$$

$$\vdots$$

$$Hu_{N^{rec}} = \sum_{i=1}^{N^{pipe}} \frac{|\vec{I}_i|}{2\pi |\vec{r}_i - \vec{r}_{u_{N^{rec}}}|} (\vec{J}i \times (\vec{r}_i - \vec{r}_{u_{N^{rec}}})) \cdot \hat{u}_{N^{rec}} \qquad (3)$$

In equations (2) through (3), $Hu_k$ generally denotes the magnetic field measured by the $k^{th}$ receiver 54 of the ranging tool 26, where k is an index number ranging from 1 to $N^{rec}$. The variable $\hat{u}_k$ represents the unit vector in the direction that the $k^{th}$ receiver 54 is oriented to receive the magnetic field, e.g., the magnetic moment vector's direction for a magnetic dipole. The variable $\vec{r}_{uk}$ is the position vector of the $k^{th}$ receiver 54 with respect to the reference point "P." These equations indicate that the magnetic field $Hu_k$ detected by one of the receivers 54 will be a summation of the contributions made by each of the $N^{pipe}$ currents induced in wellbores.

In addition to the $N^{rec}$ equations (2) through (3), another system of equations can be defined for the wellbore parameters using the assumption that the direction of the current induced in a wellbore will be orthogonal to the position vector. As illustrated in the $N^{pipe}$ equations in equations (4) through (5) below, the inner dot product of the two orthogonal vectors $\vec{I}_i$ and $\vec{r}_i$ will be zero.

$$\vec{I}_1 \cdot \vec{r}_1 = 0 \qquad (4)$$

$$\vdots$$

$$\vec{I}_{N^{pipe}} \cdot \vec{r}_{N^{pipe}} = 0 \qquad (5)$$

The total number of equations defined by equations 2 through 5 is ($N^{pipe} + N^{rec}$) the sum of the number of wellbores ($N^{pipe}$) and the number of receivers ($N^{rec}$). Since there are six "unknown" parameters associated with each of the $N^{pipe}$ wellbores as described above, the total number of unknown parameters, and thus the minimum number of equations necessary for obtaining an unambiguous solution for the unknown parameters is $6 \times N^{pipe}$. Thus, to obtain an unambiguous solution for the unknown wellbore parameters, the relation indicated in relation (6) below should generally be met. It follows that generally, the number of wellbores $N^{pipe}$ can be a function of the number of receivers $N^{rec}$ provided, and a maximum number of wellbores that can be determined unambiguously as illustrated in relation (7).

$$N^{pipe} + N^{rec} \geq 6 \times N^{pipe} \qquad (6)$$

$$\Rightarrow N^{pipe} \leq \frac{N^{rec}}{5} = N^{max} \qquad (7)$$

In some instances, where some additional information is available or can be estimated, a fewer number of receivers $N^{rec}$ can allow for a greater number of wellbores $N^{pipe}$ to be located. For example, where it is known, or it can be estimated, that each of the wellbores in a multi-wellbore system is parallel, the general relations (6) and (7) can be reduced to relations (8) and (9) below.

$$N^{pipe} + N^{rec} \geq 4 \times N^{pipe} + 2 \qquad (8)$$

$$\Rightarrow N^{pipe} \leq \frac{(N^{rec} - 2)}{3} = N^{max} \qquad (9)$$

This reduction is possible where the direction of each of the currents $\vec{I}_i$ is known to be the same for each wellbore although the amplitude for each current $\vec{I}_i$ may be dissimilar. In some embodiments, this information can be known, e.g., in a multi-wellbore system including a one or more parallel of SAGD pairs.

The number of wellbores $N^{pipe}$ can include a number of wellbores that produce a non-negligible magnetic field at the ranging tool 26. In a crowded field, such as the field depicted in FIG. 1B, contributions from a large number of wellbores may be detected by the ranging tool 26. However, some of these contributions may be negligible. For example, the attenuation of the magnetic fields produced by currents induced in wellbores at large distances from the ranging tool 26 can produce relatively small contributions to the magnetic fields detected. Also, destructive interference can produce a cancellation effect on the magnetic fields than can contribute to relatively small contributions to the magnetic fields detected. The definition of negligibility can be dependent on several system-dependent characteristics or requirements such as accuracy, noise floor, etc. A threshold $Th^{field}$ can be predetermined by one skilled in the art below which a particular contribution can be considered negligible and removed from further consideration as part of the multi-wellbore system.

Figure 5A:
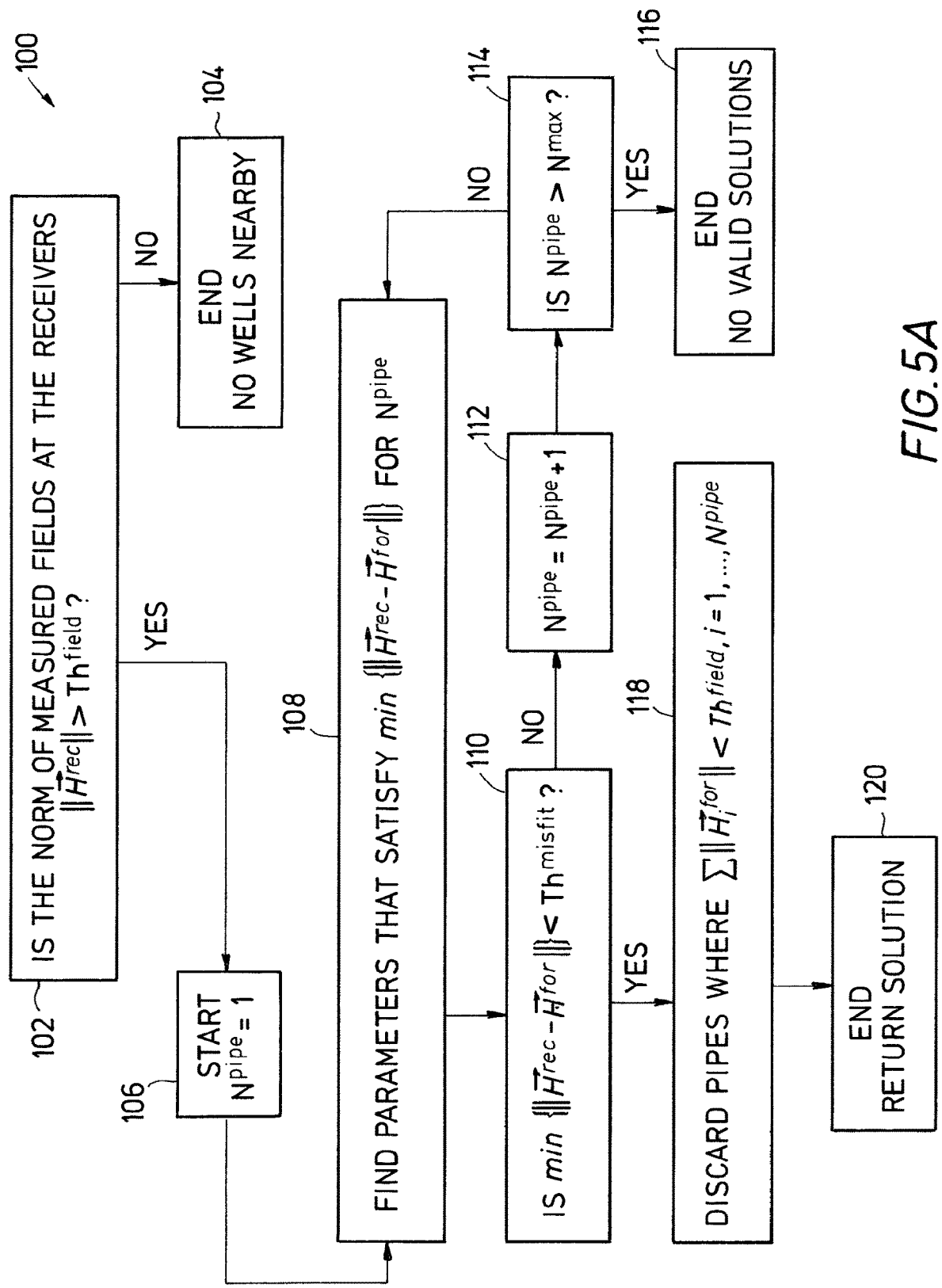
FIGS. 5A and 5B are flowcharts illustrating operational procedures that include locating multiple wellbores in accordance with example embodiments of the disclosure.

Referring to FIG. 5A, and with continued reference to FIG. 2, an operational procedure 100 can be employed for locating multiple wellbores using the data processing unit 64 of system 50 (FIG. 2). Preconditions for the procedure 100 can include that a current is induced in each wellbore to be located, the ranging tool 26 is deployed at a first operational location, and a received magnetic field $\vec{H}^{rec}$ from the first operational location is detected by the receivers 54 and communicated to the data processing unit 64, which accepts the received magnetic field $\vec{H}^{rec}$ as input. The operational procedure 100 begins at step 102 where the received magnetic field $\vec{H}^{rec}$ is received by the data processing unit and evaluated to determine if the magnitude or norm of the received magnetic field $\vec{H}^{rec}$ is greater than the predetermined field threshold $Th^{field}$ for negligibility. If the norm of the received magnetic field $\vec{H}^{rec}$ is not greater than the predetermined field threshold $Th^{field}$, then it can be determined that there are no nearby wellbores producing a non-negligible magnetic field. The procedure 100 proceeds to step 104 where the procedure 100 may end. Optionally, at the end of the procedure 100, the data processing unit 64 can provide a status to the visualization unit 60, such that a user can be alerted that no nearby wellbores were located at the first operational position. The ranging tool 26 can then be moved to a second operational position, and the procedure 100 can be repeated. The preconditions and post process return to step 102 where another received magnetic field $\vec{H}^{rec}$ can be evaluated.

Where it is determined at step 102 that the norm of the received magnetic field $\vec{H}^{rec}$ is greater than the predetermined field threshold $Th^{field}$, there may be nearby wellbores contributing to the received magnetic field $\vec{H}^{rec}$. The procedure 100 proceeds to step 106 where an iterative inversion process can be initiated to determine the number and locations of the contributing wellbores. Initially, at step 106, an estimated number of contributing wellbores can be selected. Generally, an estimate of one (1) can be selected, although in some exemplary embodiments a higher number of wellbores can be estimated, e.g., if it is known that a minimum number of wellbores are nearby. The variable $N^{pipe}$ is set to the initial estimate at step 106.

Next, the procedure 100 proceeds to step 108 where at least one parameter set is calculated for the estimated number of wellbores $N^{pipe}$ which would produce the received magnetic field $\vec{H}^{rec}$. For example, when the estimated number of wellbores $N^{pipe}$ is set to one (1), the parameter set for a single wellbore which would produce the received magnetic field $\vec{H}^{rec}$ at the operational location of the receivers is calculated. The at least one parameter set may include the at least the six unknown parameters associated with the vector parameters $\vec{r}_i$ and $\vec{r}_j$, and can be calculated by solving the system of equations defined by equations (2) through (5) described above. Often, this system of equations will not have a unique solution, and solving the system of equations yields a plurality of parameter sets. A forward model magnetic field $\vec{H}^{for}$ is determined for each parameter set. The forward model magnetic fields $\vec{H}^{for}$ can be determined by solving equation (2) above. Next, for each forward model $\vec{H}^{for}$ determined, the norm of the difference between the received magnetic field $\vec{H}^{rec}$ and the forward model magnetic field $\vec{H}^{for}$, and the parameter set producing the minimum value is selected. For example, the parameter set that satisfies $\min\{\|\vec{H}^{rec}-\vec{H}^{for}\|\}$ for the estimated number of wellbores $N^{pipe}$ is selected.

Next, the procedure 100 proceeds to step 110, where the norm of the difference between the received magnetic field $\vec{H}^{rec}$ and forward model magnetic $\vec{H}^{for}$ for the selected parameter set, i.e., $\min\{\|\vec{H}^{rec}-\vec{H}^{for}\|\}$ is compared to a predetermined misfit threshold $Th^{msifit}$. The predetermined misfit threshold $Th^{msifit}$ can be based on the particular properties of the ranging tool 26, accuracy requirements, noise conditions, etc., and can be predetermined by one skilled in the art to indicate when an acceptable solution is found. Where $\min\{\|\vec{H}^{rec}-\vec{H}^{for}\|\}$ for the estimated number of wellbores $N^{pipe}$ is not less than the predetermined misfit threshold $Th^{msifit}$, the procedure 100 proceeds to step 112 where the estimated number of wellbores $N^{pipe}$ is incrementally increased. For example, the estimated number of wellbores $N^{pipe}$ is increased by one (1).

Next, in step 114, the increased estimated number of wellbores $N^{pipe}$ is compared to the maximum number of wellbores $N^{max}$ that are locatable by the system 50. The maximum number of wellbores $N^{max}$ can be a function of the number of receivers $N^{rec}$ provided on the ranging tool 26 as indicated above with reference to equations (7) and (9). If the increased estimated number of wellbores $N^{pipe}$ is greater than the maximum number of wellbores $N^{max}$, it can be concluded that no valid solutions exist using the procedure 100, and the procedure 100 proceeds to step 116 where the procedure 100 ends.

If the increased estimated number of wellbores $N^{pipe}$ is not greater than the maximum number of wellbores $N^{max}$, the procedure 100 returns to step 108 where the parameter set satisfying $\min\{\|\vec{H}^{rec}-\vec{H}^{for}\|\}$ for the increased estimated number of wellbores $N^{pipe}$ is selected. The steps 108 through 114 can be repeated until it is determined in step 110 that the difference between the received magnetic field $\vec{H}^{rec}$ and the forward model magnetic field $\vec{H}^{for}$ determined for the selected parameter set is less than the predetermined misfit threshold $T^{misfit}$. Then, it can be concluded that the selected parameter set represents a valid solution, and the procedure 100 proceeds to optional step 118. In step 118, the individual contributions of each of the $N^{pipe}$ wellbores represented in the selected parameter set are calculated and compared to the predetermined field threshold $Th^{field}$. If any of the individual contributions are determined to be negligible, (less than the predetermined field threshold $Th^{field}$) the wellbores making the negligible contributions can be discarded or disregarded. In some example embodiments, the individual contributions may be extracted from the calculations performed in step 108 for calculating the forward model magnetic field $\vec{H}^{for}$. In some instances, step 118 can result in each of the $N^{pipe}$ wellbores being disregarded. For example, each individual wellbore can make a contribution that is less than the predetermined field threshold $Th^{field}$, while the combined is greater than the predetermined field threshold $Th^{field}$.

Then the procedure 100 can proceed to step 120 where the non-negligible solutions can be returned. The solutions returned can include, for example, the vector parameter $\vec{r}_i$ and/or the vector parameter $\vec{T}_i$ for each wellbore making a non-negligible contribution. In some embodiments, parameters such as the current magnitude, azimuth angle and the orientation of the wellbores can be measured or determined from the selected parameter set by the data processing unit 64, and these parameters can be returned as solutions. In some exemplary embodiments, the solutions can be returned to the visualizing unit 60 for evaluation by a user, or to any other component of system 50.

Figure 5B:
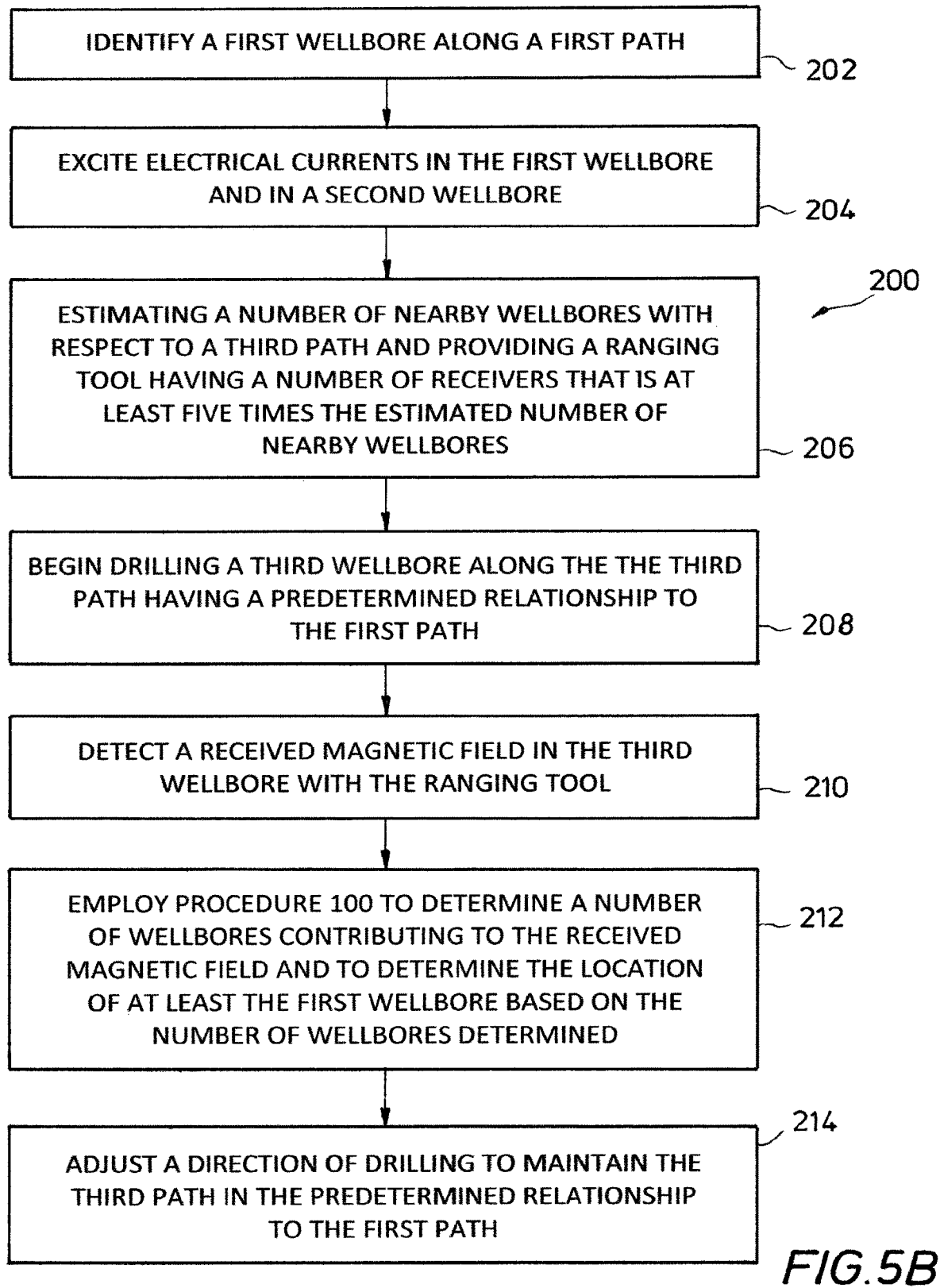
Figure 6:
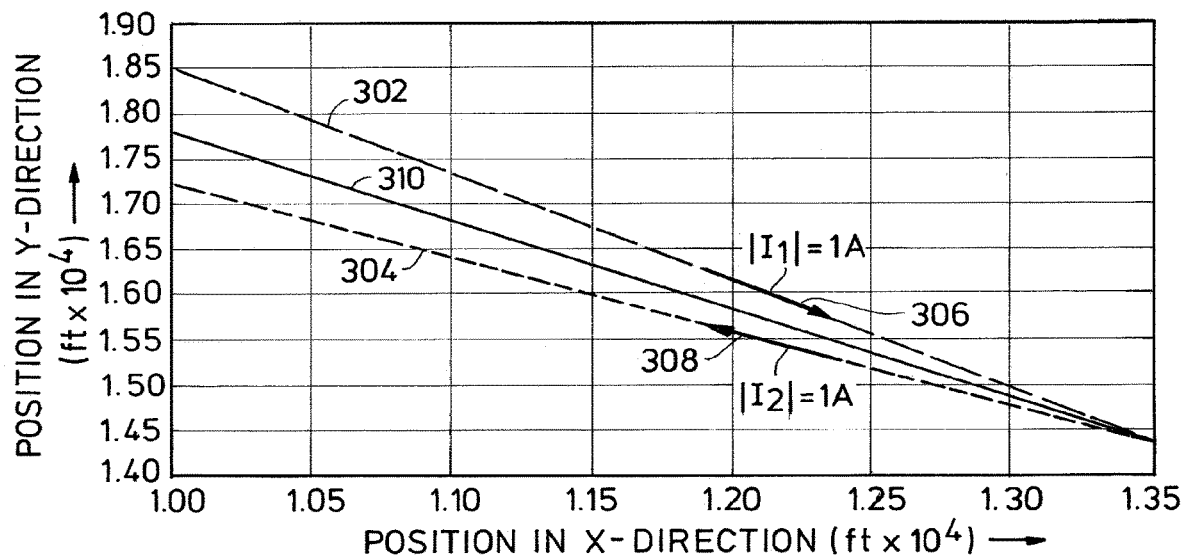
FIG. 6 is a graphical view of a mathematically simulated example of a two-wellbore system illustrating simulated location curves for first and second wellbores and a simulated path of a ranging tool for determining the respective locations of the first and second wellbores using an inversion portion of the operational procedure illustrated in FIG. 5A.

Referring now to FIG. 5B, and with continued reference to FIGS. 2 and 4, an exemplary embodiment of an operational procedure 200 for forming a wellbore in a geologic formation "G" is described. The procedure 200 begins at step 202 where, a first wellbore 12 is identified extending along a first path. The first wellbore 12 can be an existing wellbore identified in a crowded field, or the first wellbore 12 can be drilled using any drilling method recognized in the art. A first electrical current $I_{eff_1}$ can then be induced in the first wellbore and a second current $I_{eff_2}$ can be induced in the second wellbore 14 (step 204). In some embodiments, the first and second electrical currents $I_{eff_1}$ and $I_{eff_2}$ can be excited remotely, e.g., with transmitters 52 of ranging tool 26. Thus, the second current $I_{eff_2}$ can be excited in the second wellbore 14 without expressly identifying the location or verifying the existence of the second wellbore 14. In other embodiments, the first and second currents $I_{eff_1}$ and $I_{eff_2}$ can be directly excited by current source 32 (FIG. 1) at the surface location "S." In one or more embodiments, the first and second currents $I_{eff_1}$ and $I_{eff_2}$ can be excited at a different point within procedure 200, and the first and second currents $I_{eff_1}$ and $I_{eff_2}$ can be maintained continuously or continually throughout the procedure 200.

At step 206, a third path can be defined having a predetermined relationship to the first path is defined. In one or more exemplary embodiments, the third path can be generally parallel to the first path, e.g., when the first and third wellbores comprise an SAGD pair. In other embodiments, the predetermined relationship can be an intersecting relationship where the third wellbore intersects the first wellbore at a predetermined or true depth, a lateral branching relationship where the third wellbore branches from the first wellbore at a predetermined location. A number of wellbores $N^{pipe}$ nearby at least a portion of the third path can be estimated to determine a sufficient number of receivers $N^{rec}$ for locating the estimated number of nearby wellbores $N^{pipe}$. The sufficient number of receivers can be determined, e.g., from equations (7) and (9) above, and in some embodiments is at least five (5) times the estimated number of nearby wellbores $N^{pipe}$. A ranging tool 26 including the sufficient number of receivers 54 can be provided in a drill string 18 (FIG. 1A).

Next in step 208, the drill string 18 can be employed to begin drilling the third wellbore 16 along the third path. When the ranging tool 26 is disposed at a first operational position within the third wellbore 16, the received magnetic field $\vec{H}^{rec}$ can be detected with the receivers 54, and the received magnetic field $\vec{H}^{rec}$ can be communicated to the data processing unit 64 (step 210).

Next, at step 212, the data processing unit 64 can perform procedure 100 (FIG. 5A) to determine a number of wellbores $N^{pipe}$ contributing to the received magnetic field $\vec{H}^{rec}$ at the first operational position. The data processing unit 64 can thereby determine the location of at least the first wellbore 12 with respect to the third wellbore 16. The location of the first wellbore 12 is returned, and can be used to adjust a direction of drilling to maintain the path of the third wellbore 16 in the predetermined relationship with the first path of the first wellbore 12 (step 214).

Next the procedure 200 returns to step 210 where the ranging tool 26 can again receive a received magnetic field $\vec{H}^{rec}$ from a second operational position along the third path. The procedure 200 can repeat steps 210 through 214 until the third wellbore 16 is complete, and close tolerances can be maintained even when the number of wellbores $N^{pipe}$ making a non-negligible contribution to the received magnetic field changes along the third path.

2. Example Implementation

Referring now to FIGS. 6 through 9B, one example of a mathematically simulated a two-wellbore system 300 is illustrated. A first wellbore 302 (Pipe 1) and a second wellbore 304 (Pipe 2) are simulated in a common plane designated by axes x and y. Currents $I_1$ and $I_2$ are simulated in generally opposite directions along the first and second paths defined by the first and second wellbores 302, 304 as illustrated by arrows 306 and 308. The simulated currents $I_1$ and $I_2$ each have a magnitude 1 Amp. A third path 310 is also illustrated between the first and second wellbores 302, 304 along which ranging tool 26 (FIG. 7) is moved.

Figure 7:
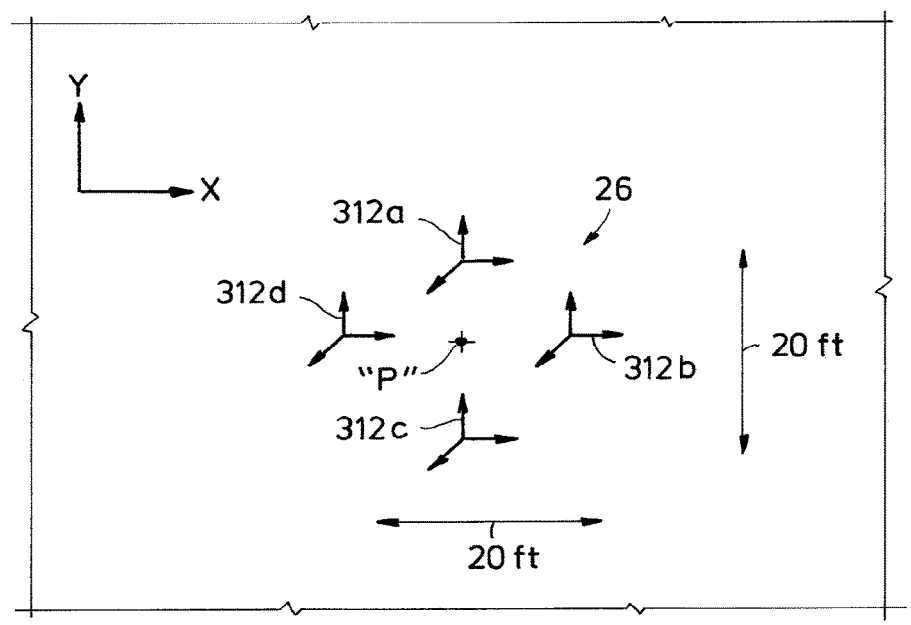
FIG. 7 is a schematic view of a sensor arrangement for the ranging tool of FIG. 6.

As illustrated in FIG. 7, the ranging tool 26 is simulated as including 4 tri-axial receivers 312a, 312b, 312c and 312d disposed symmetrically around reference point "P." The tri-axial receivers 312a, 312c are separated along the y-axis by 20 ft., and the tri-axial receivers 312b, 312d are separated along the x-axis by 20 ft. The reference point "P" at the center of the tri-axial receivers 312a, 312b, 312c and 312d was simulated to move along the third path 310 illustrated in FIG. 6.

At a plurality of operational locations along the third path 310, a forward model magnetic field $\vec{H}^{for}$ was calculated induced by the first and second currents $I_1$ and $I_2$ for each of the receivers 312a, 312b, 312c and 312d. To simulate a received magnetic field $\vec{H}^{rec}$, a one percent 1% multiplicative error with uniform distribution was added to the calculated forward model magnetic field $\vec{H}^{for}$ for each of the receivers 312a, 312b, 312c and 312d at each of the operational locations along the third path 310. Once the received magnetic field $\vec{H}^{rec}$ was simulated, the system of equations illustrated by equations (2) through (5) were solved as described above with reference to of step 108 of procedure 100 (FIG. 5A). Since the number of simulated wellbores was known, the variable $N^{pipe}$ was defined as two (2), and the iterative process of steps 110, 112, and 114 were not necessary for determining the number of nearby wellbores.

The parameter set satisfying $\min\{\|\vec{H}^{rec}-\vec{H}^{for}\|\}$ for an $N^{pipe}$ of two (2) wellbores was determined and the locations of the first and second wellbores 302, 304 were extracted therefrom for each of the operational locations. The extracted locations are plotted in FIG. 8 along the simulated first and second paths for the first and second wellbores 302, 304. The extracted locations for the first wellbore 302 are illustrated as asterisks and the extracted locations for the second wellbore 304 are illustrated as diamonds. As illustrated in FIG. 8, the extracted locations are more accurate where the third path 310 of the ranging tool 26 (is relatively close to the first and second wellbores 302, 304 (toward the right of the graph). In this example, the accuracy is particularly high where the ranging tool 26 is closer than a radial distance "R" of about 61 meters (about 200 feet). This range is relatively important for well avoidance and intersection purposes.

Figure 9A:
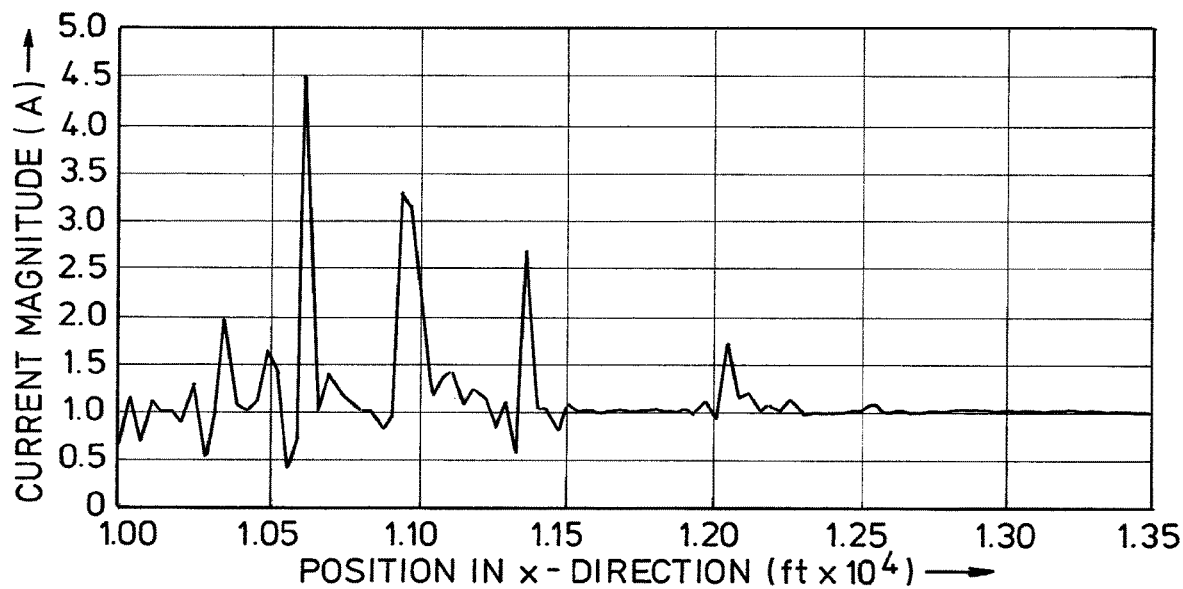
FIGS. 9A and 9B are graphical views illustrating data indicative of a current magnitude calculated for a simulated current of 1 Amp flowing respectively through the first and second wellbores of FIG. 6.
Figure 9B:
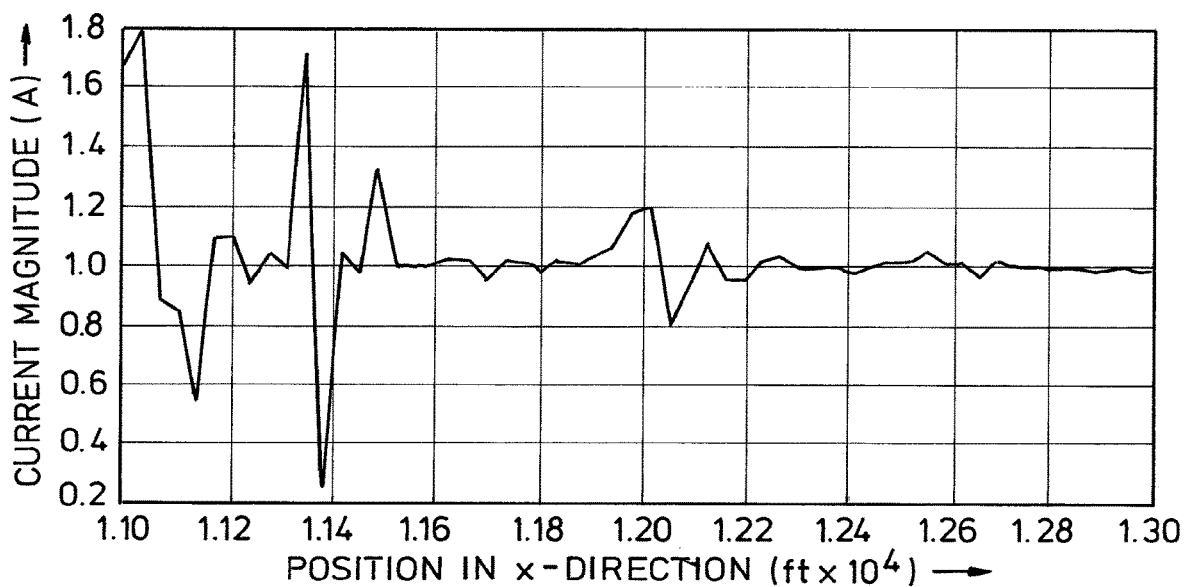

As illustrated in FIGS. 9A and 9B, currents were also extracted from the parameter set found to satisfy $\min\{\|\vec{H}^{rec}-\vec{H}^{for}\|\}$. Again, in FIGS. 9A and 9B, the x-axis represents the position of the respective wellbores along the x-axis direction. The y-axis represents the magnitude of the extracted currents. The current magnitudes illustrated are closest to the 1 Amp magnitude of the first and second currents $I_1$ and $I_2$ (FIG. 6) where the ranging tool 26 is simulated to be closest to the simulated wellbores (toward the right of the graphs). Again, the accuracy is illustrated to be relatively high in a range where accuracy is relatively important for well avoidance and well intersection purposes.

3. Aspects of the Disclosure

In one aspect of the disclosure, a method of locating multiple wellbores includes (a) exciting a first electrical current in a first wellbore, (b) exciting a second electrical current in a second wellbore, (c) disposing a ranging tool at a remote location with respect to the first and second wellbores, (d) receiving and detecting a magnetic field at the remote location with receivers provided on the ranging tool, and (e) measuring at least one wellbore parameter of each of the first wellbore and the second wellbore from the magnetic field received by the ranging tool.

In some exemplary embodiments, the at least one wellbore parameter includes at least one of the group consisting of the first electrical current, the second electrical current, a distance of either of the first and second wellbores from the receivers, azimuth angle of either of the first and second wellbores, and an orientation of first and second wellbores. The at least one wellbore parameter can include a magnitude of least one of the first current and the second current.

In one or more exemplary embodiments, the method further includes determining that the received magnetic field is greater than a predetermined field threshold. The method may also include calculating a contribution of each of the first and second to wellbores to the received magnetic field, and determining that the contribution of at least one of the first and second wellbores is greater than the predetermined field threshold.

In some exemplary embodiments, the method further includes determining from the received magnetic field a number of wellbores contributing to the received magnetic field. The method may also include determining from the received magnetic field that the number of wellbores contributing to the magnetic field received by the ranging tool is greater than two and measuring from the received magnetic field at least one wellbore parameter of at least one wellbore other than the first wellbore and the second wellbore. The method can include determining that the contribution of the at least one wellbore other than the first wellbore and the second wellbore to the received magnetic field is greater than a predetermined threshold value.

In some exemplary embodiments, determining the number of wellbores contributing to the magnetic field may include (a) estimating the number of wellbores to define an estimated number of wellbores, (b) calculating at least one parameter set for the estimated number of wellbores which would produce the received magnetic field, (c) determining a forward model magnetic field for each parameter set calculated for the estimated number of wellbores, (d) selecting the parameter set of the at least one parameter set for which a difference between the received magnetic field and the forward model magnetic field is the least, and (e) determining that the difference between the received magnetic field and forward model magnetic field for the selected parameter set is less than a predetermined misfit threshold.

In one or more embodiments, the method may further include determining that the difference between the received magnetic field and forward model magnetic field is not less than the predetermined misfit threshold and incrementally increasing the estimated number of wellbores. The method may also include determining that the incrementally increased estimated number of wellbores is not greater than a maximum number of wellbores, wherein the maximum number of wellbores is based on a number of receivers provided on the ranging tool. In some exemplary embodiments the method further includes determining that a magnitude of the received magnetic field is greater than a predetermined field threshold, wherein the field threshold is selected based on an accuracy of the receivers in detecting a magnetic field strength. The method may include selecting the predetermined misfit threshold based on properties of the ranging tool and accuracy requirements for the measurement of the at least one wellbore parameter of each of the first wellbore and the second wellbore.

In some exemplary embodiments, disposing the ranging tool at a remote location includes deploying the ranging tool on a drill string within a third wellbore, wherein measuring at least one wellbore parameter comprises measuring a distance of at least one of the first and second wellbores from the receivers, and wherein the method further comprises directionally drilling the third wellbore in a predetermined relationship with respect to at least one of the first and second wellbores. The predetermined relationship may include at least one of a parallel relationship, a non-intersecting relationship, an intersecting relationship, and a laterally branching relationship.

In some exemplary embodiments, the first and second currents are excited at the same frequency, and the received magnetic field is received by an array of single axis magnetometers located in a third wellbore. In some embodiments, the array of single axis magnetometers may include eight (8) magnetometers, and the eight (8) magnetometers may be staggered along an axis of the ranging tool. In other exemplary embodiments, an array of single axis magnetometers is provided for receiving the received magnetic field, where the number of single axis magnetometers in the array is at least two (2) less than three times an estimated number of nearby wellbores (i.e., $N^{rec} \geq N^{pipe}-2$) at the remote location with receivers provided on the ranging tool.

In some exemplary embodiments, the first and second wellbores are an injector and producer respectively of an SAGD pair. In some embodiments, the first wellbore is a producer of a first SAGD pair, and the second wellbore is a producer of a second SAGD pair. In some embodiments, the first wellbore is an injector of a first SAGD pair and the second wellbore is a producer of a second SAGD pair. In some embodiments, the first wellbore is an injector of a first SAGD pair and the second wellbore is an injector of a second SAGD pair. In some embodiments, the first wellbore is a producer of an SAGD pair, and the second wellbore is a lateral wellbore branching from the first wellbore.

According to another aspect of the disclosure a method of forming a wellbore in a geologic formation includes (a) identifying a first wellbore in the geologic formation along a first path, (b) exciting a first electrical current along the first path in the first wellbore and a second electrical current along a second path in a second wellbore, (c) drilling a third wellbore along a third path having a predetermined relationship to the first path, (d) detecting a received magnetic field in the third wellbore, (e) determining from the received magnetic field a number of wellbores contributing to the received magnetic field, (f) determining a location of the first wellbore based on the number of wellbores determined to be contributing to the received magnetic field, and (g) adjusting a direction of drilling of the second wellbore to maintain the third path in the predetermined relationship to the first path.

In one or more exemplary embodiments, determining the number of wellbores contributing to the magnetic field includes (a) estimating the number of wellbores to define an estimated number of wellbores, (b) calculating at least one parameter set for the estimated number of wellbores which would produce the received magnetic field, (c) determining a forward model magnetic field for each parameter set calculated for the estimated number of wellbores, (d) selecting the parameter set of the at least one parameter set for which a difference between the received magnetic field and the forward model magnetic field is the least, and (c) determining that the difference between the received magnetic field and forward model magnetic field for the selected parameter set is less than a predetermined misfit threshold. In some embodiments, the determined location of the first wellbore is a parameter in the selected parameter set.

In some exemplary embodiments, the method further includes estimating the number of wellbores to be determined from the received magnetic field and deploying a ranging tool having $N^{rec}$ single axis receivers where $N^{rec}$ is at least five times greater than an the estimated number of wellbores. In some exemplary embodiments, the predetermined relationship is a generally parallel relationship wherein one of the first and third wellbores is shallower than the other of the first and third wellbores such that the first and second wellbores together define an SAGD pair.

In another aspect of the disclosure, a system for locating multiple wellbores include (a) a non-transitory memory having a set of instructions thereon, wherein the instructions include instructions for accepting a received magnetic field as input, instructions for determining from the received magnetic field a number of wellbores contributing to the received magnetic field and instructions for determining at least one parameter of each wellbore determined to be contributing to the received magnetic field; and a processor for executing the set instructions.

In some exemplary embodiments, the instructions for determining the number of wellbores contributing to the received magnetic field may include instructions for (a) estimating the number of wellbores contributing to the received magnetic field to define an estimated number of wellbores, (b) calculating at least one parameter set for the estimated number of wellbores which would produce the received magnetic field, (c) determining a forward model magnetic field for each parameter set calculated for the estimated number of wellbores, (e) selecting the parameter set of the at least one parameter set for which a difference between the received magnetic field and the forward model magnetic field is the least, and (f) determining whether the difference between the received magnetic field and forward model magnetic field for the selected parameter set is less than a predetermined misfit threshold.

In one or more exemplary embodiments, the system further includes a drill string and ranging tool carried by the drill string. In some embodiments, the ranging tool may include a receiver operable to detect and measure the received magnetic field, and the ranging tool may be communicatively coupled to the processor. In some exemplary embodiments, the ranging tool may further include a transmitter operable to generate an electromagnetic probe signal that causes current to flow in electrically conductive bodies exterior to the transmitters to thereby generate the received magnetic field. Also, in some exemplary embodiments, the system may further include a transmitter deployed independently of the ranging tool into a first wellbore of a SAGD pair of wellbores, and the drill string may be deployed into a second wellbore of the SAGD pair.

Moreover, any of the methods described herein may be embodied within a system including electronic processing circuitry to implement any of the methods, or a in a computer-program product including instructions which, when executed by at least one processor, causes the processor to perform any of the methods described herein.

The Abstract of the disclosure is solely for providing the United States Patent and Trademark Office and the public at large with a way by which to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed is:

1. A method of forming a wellbore in a geologic formation, the method comprising:
   identifying a first wellbore in the geologic formation along a first path;
   exciting a first electrical current along the first path in the first wellbore and a second electrical current along a second path in a second wellbore during the exciting of the first electrical current in the first wellbore and at a same frequency as the first electrical current;
   drilling a third wellbore along a third path having a predetermined relationship to the first path;
   detecting a received magnetic field in the third wellbore;
   determining from the received magnetic field an unknown number of wellbores contributing to the received magnetic field;
   determining a location of the first wellbore based on the number of wellbores determined to be contributing to the received magnetic field; and
   adjusting a direction of drilling of the third wellbore to maintain the third path in the predetermined relationship to the first path.

2. The method of claim 1, wherein determining the number of wellbores contributing to the magnetic field comprises:

estimating the number of wellbores to define an initial estimated number of wellbores;

calculating at least one parameter set for the initial estimated number of wellbores which would produce the received magnetic field;

determining an initial forward model magnetic field for each parameter set calculated for the initial estimated number of wellbores;

selecting the parameter set of the at least one parameter set for which a difference between the received magnetic field and the initial forward model magnetic field is the least;

determining that a difference between the received magnetic field and the initial forward model magnetic field for the selected parameter set is greater than a predetermined misfit threshold;

incrementally adjusting the initial estimated number of wellbores to define an updated estimated number of wellbores;

calculating at least one parameter set for the updated estimated number of wellbores which would produce the received magnetic field;

determining an updated forward model magnetic field for each parameter set calculated for the updated estimated number of wellbores;

selecting the parameter set of the at least, one parameter set for which a difference between the received magnetic field and the updated forward model magnetic field is the least; and determining that the difference between the received magnetic field and the updated forward model magnetic field for the selected parameter set is less than the predetermined misfit threshold.

3. The method of claim 2, wherein the determined location of the first wellbore is a parameter in the selected parameter set.

4. The method of claim 1, further comprising:

estimating the number of wellbores to be determined from the received magnetic field; and deploying a ranging tool having $N^{rec}$ single axis receivers where $N^{rec}$ is at least five times greater than an estimated number of wellbores.

5. The method of claim 1, wherein the predetermined relationship is a generally parallel relationship wherein one of the first and third wellbores is shallower than the other of the first and third wellbores such that the first and second wellbores together define a Steam Assisted Gravity Drainage (SAGD) pair.

6. The method of claim 1, wherein determining the unknown number of wellbores contributing to the received magnetic field includes determining the number of nearby wellbores producing a contribution to the received magnetic field that is greater than a field threshold.

7. The method of claim 1, further comprising measuring each of a trajectory and a position of each of the first and second wellbores.

8. The method of claim 1, wherein detecting the received magnetic field includes detecting a combined magnetic field comprising a first magnetic field induced by the first electrical current and a second magnetic field induced by the second electrical current.

9. The method of claim 8, wherein the first and second magnetic fields overlap in the third wellbore.

10. The method of claim 8, wherein the combined magnetic field is a summation of the contributions made by the first and second electrical currents.

11. The method of claim 2, wherein incrementally adjusting the initial estimated number of wellbores includes increasing the initial estimated number of wellbores by one such that the updated estimated number of wellbores is one more than the initial estimated number of wellbores.

12. The method of claim 2, further comprising limiting the updated estimated number of wellbores with a maximum number of wellbores based on a number of receivers provided on a ranging tool.

* * * * *